(12) United States Patent
Schmitz et al.

(10) Patent No.: US 10,800,087 B2
(45) Date of Patent: Oct. 13, 2020

(54) FILM-MAKING MACHINE FOR PRODUCING STRETCH FILM

(71) Applicant: Windmöller & Hölscher KG, Lengerich (DE)

(72) Inventors: Torsten Schmitz, Greven (DE); Christian Schlenger, Glandorf (DE); Daniel Stöveken, Münster (DE); Waldemar Colell, Lienen (DE)

(73) Assignee: Windmöller & Hölscher KG, Lengerich (DE)

( * ) Notice: Subject to any disclaimer, the term of this patent is extended or adjusted under 35 U.S.C. 154(b) by 336 days.

(21) Appl. No.: 15/536,214

(22) PCT Filed: Dec. 11, 2015

(86) PCT No.: PCT/EP2015/079393
§ 371 (c)(1),
(2) Date: Jun. 15, 2017

(87) PCT Pub. No.: WO2016/096646
PCT Pub. Date: Jun. 23, 2016

(65) Prior Publication Data
US 2017/0326776 A1  Nov. 16, 2017

(30) Foreign Application Priority Data
Dec. 19, 2014 (DE) .................. 10 2014 119 205

(51) Int. Cl.
*B29C 48/27* (2019.01)
*B29C 48/08* (2019.01)
(Continued)

(52) U.S. Cl.
CPC .......... *B29C 48/274* (2019.02); *B29C 43/222* (2013.01); *B29C 48/08* (2019.02);
(Continued)

(58) Field of Classification Search
CPC . B29C 48/914; B29C 48/9155; B29C 48/274; B29C 47/8845; B29C 47/886;
(Continued)

(56) References Cited

U.S. PATENT DOCUMENTS 3,159,696 A * 12/1964 Hodgson, Jr. ........... B29C 48/08
264/556
3,374,303 A * 3/1968 Metz, Jr. ............... B29C 33/044
264/216
(Continued)

FOREIGN PATENT DOCUMENTS

DE   1 479 904   6/1969
DE   26 12 575   10/1976
(Continued)

OTHER PUBLICATIONS

German Office Action dated Aug. 13, 2015, of corresponding German Application No. 10 2014 119 205.2, along with an English translation.
(Continued)

*Primary Examiner* — Ammas Rashid
*Assistant Examiner* — S. Behrooz Ghorishi
(74) *Attorney, Agent, or Firm* — DLA Piper LLP (US)

(57) ABSTRACT

A film-making machine that produces stretch film includes an outlet device with an outlet gap for outlet of free-flowing film material and a rotatably mounted casting roll that receives the released free-flowing film material on a surface of the casting roll, and a cleaning device with a rotatably mounted cleaning roll that contacts the film material lying on the surface of the casting roll, wherein the cleaning device has an adjusting mechanism with a circumferential adjustment that adjusts a cleaning position of the cleaning roll along a circumferential direction of the casting roll.

8 Claims, 6 Drawing Sheets

(51) Int. Cl.
  *B29C 48/88* (2019.01)
  *B29C 43/22* (2006.01)
  *B29C 48/92* (2019.01)
  *B29C 43/46* (2006.01)

(52) U.S. Cl.
  CPC ........ *B29C 48/914* (2019.02); *B29C 48/9155* (2019.02); *B29C 48/92* (2019.02); *B29C 2043/462* (2013.01); *B29C 2948/9218* (2019.02); *B29C 2948/92076* (2019.02); *B29C 2948/92171* (2019.02); *B29C 2948/92571* (2019.02); *B29C 2948/92714* (2019.02)

(58) Field of Classification Search
  CPC ..... B29C 47/92; B29C 43/222; B29C 33/044; B29C 2947/92076; B29C 2947/92714; B29C 48/92; B29C 48/08; B29C 2948/92714; B29C 2948/92571; B29C 2948/9218; B29C 2948/92171; B29C 2948/92076; B29C 2043/462; B29C 41/26; B29C 41/46
  See application file for complete search history.

(56) References Cited

U.S. PATENT DOCUMENTS

| | | | | |
|---|---|---|---|---|
| 4,627,804 A | * | 12/1986 | Kobayashi | .............. B29C 43/24 425/71 |
| 5,295,805 A | | 3/1994 | Akamatsu et al. | |
| 2010/0258960 A1 | | 10/2010 | Takahata et al. | |
| 2014/0150679 A1 | * | 6/2014 | Claude | .................. B41F 9/1018 101/167 |
| 2016/0082643 A1 | * | 3/2016 | Matsumoto | ........... B29C 43/222 264/177.19 |

FOREIGN PATENT DOCUMENTS

| | | | |
|---|---|---|---|
| DE | 36 35 302 | 4/1988 | |
| DE | 3635302 A1 * | 4/1988 | ............. B29C 48/08 |
| DE | 693 14 404 T2 | 4/1998 | |
| DE | 10 2008 035 737 A1 | 2/2010 | |
| DE | 102008035737 A1 * | 2/2010 | ............. B29C 43/46 |
| EP | 0 862 982 | 9/1998 | |
| GB | 1 526 514 | 9/1978 | |
| WO | 2014/156807 A1 | 10/2014 | |

OTHER PUBLICATIONS

Written Opinion dated Jan. 27, 2017, of corresponding PCT/EP2015/079393, along with an English translation.
Written Opinion dated Nov. 22, 2016, of corresponding PCT/EP2015/079393, along with an English translation.
Informal Communication with the Applicant dated Apr. 4, 2017, of corresponding PCT/EP2015/079393, along with an English translation.
Request for Reduction/Limitation of the Claims of Payment of Additional Fees dated Nov. 22, 2016, of corresponding PCT/EP2015/079393, along with an English translation.
Request for Payment of Additional Fees dated Apr. 6, 2016, of corresponding PCT/EP2015/079393, along with an English translation.
German Office Action dated Apr. 29, 2020, of corresponding German Application No. 10 2014 119 205.2, along with an English Summary.

* cited by examiner

FILM-MAKING MACHINE FOR PRODUCING STRETCH FILM

TECHNICAL FIELD

The invention relates to a film-making machine and a method for adapting a cleaning position of a cleaning roll of a film-making machine.

BACKGROUND

It is known to use film-making machines for producing stretch film. Normally such film-making machines are provided with an outlet device which applies free-flowing film material supplied by an extruder through an outlet gap to a casting roll. This casting roll normally rotates and is configured in particular so as to be coolable. During rotation the film material applied in a free-flowing manner will cool down to below the melting point. As it solidifies, the film material becomes a film web, which can be lifted off the casting roll and transported further. It is of critical importance to effect cooling in a satisfactory manner so that a firm film web is produced from the liquid/free-flowing film material, before the film web is lifted off. During the cooling process it may happen that components of the free-flowing film material gas out and condense on the surface of the casting roll. In other words, impurities through condensation are created between the film material and the surface of the casting roll. In the course of a prolonged production process such contamination can build up leading to a high number of rejects or even tearing off within the film-making machine. Therefore cleaning devices with cleaning rolls are known, which clean the film material in the region of the frost line which represents the transition between the free-flowing film material and the solid film material. The cleaning function is performed in that the film material is pressed by the cleaning roll against the surface of the casting roll so that in this way the condensate droplets and other impurities are lifted off the casting roll together with the film web and transported away.

The disadvantage with known film-making machines consists in that the position of the cleaning roll is defined. This defined positioning results in the line speed of the film-making machine being limited as regards the line speed. In the case of stretch film the degree of stretchability is particularly important to the quality and the price of the stretch film. High stretchability can be achieved, in particular, through high melting temperatures of the film material used as well as through slow cooling rates. Due to the defined position of the cleaning roll and the necessary correlation between the position of the cleaning roll and the frost line, however, a variation of the contact length on the casting roll is not possible. Therefore either only maximum stretchability for the stretch film is achievable, or it is necessary to run the film-making machine at a correspondingly slow line speed with slow cooling rates and/or high melting temperatures.

It is the object of the present invention, to at least partially eliminate the above-mentioned disadvantages. In particular, it is the object of the present invention, to increase the line speed of the film-making machine in a low-cost and simple manner.

SUMMARY

We provide a film-making machine that produces stretch film including an outlet device with an outlet gap for outlet of free-flowing film material and a rotatably mounted casting roll that receives the released free-flowing film material on a surface of the casting roll, and a cleaning device with a rotatably mounted cleaning roll that contacts the film material lying on the surface of the casting roll, wherein the cleaning device has an adjusting mechanism with a circumferential adjustment that adjusts a cleaning position of the cleaning roll along a circumferential direction of the casting roll.

We also provide a method of adjusting a cleaning position of a cleaning roll of the film-making machine that produces stretch film including an outlet device with an outlet gap for outlet of free-flowing film material and a rotatably mounted casting roll that receives the released free-flowing film material on a surface of the casting roll, and a cleaning device with a rotatably mounted cleaning roll that contacts the film material lying on the surface of the casting roll, wherein the cleaning device has an adjusting mechanism with a circumferential adjustment that adjusts a cleaning position of the cleaning roll along a circumferential direction of the casting roll, including detecting a frost line of solidifying film material on the surface of a casting roll of the film-making machine, and moving the cleaning roll in a circumferential direction of the casting roll to the cleaning position at the frost line by a circumferential adjustment of an adjusting mechanism of a cleaning device.

LIST OF REFERENCE SYMBOLS 10 film-making machine
12 frame
14 control unit
20 outlet device
22 outlet gap
24 receiving location
30 casting roll
32 surface
40 cleaning device
42 cleaning roll
44 drive
50 adjusting mechanism
52 circumferential adjustment
54 radial adjustment
56 sensor device
60 tear-off roll
64 lift-off location
70 detection device
100 film material
110 film web
α wrap angle
PP cleaning position WP maintenance position
VA adjustment axis
RA rotation axis
FL frost line

DETAILED DESCRIPTION

Characteristics and details which have been described in connection with the film-making machine according to the invention of course also apply in the context of the method according to the invention and vice-versa, respectively, so that as regards disclosure of individual aspects of the invention, reference is made/can be made from one to the other.

A film-making machine according to the invention is used for manufacturing stretch film. To this end an outlet device with an outlet gap is provided for the outlet of free-flowing film material onto a rotatably mounted casting roll. The released free-flowing film material is received on the surface of the casting roll. Furthermore a cleaning device is provided, which comprises a rotatably mounted cleaning roll for contacting the film material arranged on the surface of the casting roll. A film-making machine according to the invention is characterised in that the cleaning device comprises an adjusting mechanism with a circumferential adjustment for adjusting a cleaning position of the cleaning roll along the circumferential direction of the casting roll.

Basically therefore the film-making machine according to the invention is based on known film-making machines and in particular comprises a cleaning device. The function of the cleaning roll is carried out in basically a known manner, so that again contacting and pressing-on of the free-flowing film material, which is arranged on the surface of the casting roll, leads to the impurities between the film material and the surface of the casting roll being squeezed between the film material and the surface of the casting roll. This means therefore that a temporary connection, in particular, is made between the impurities and the film material, which leads to these impurities being carried along when the film web is lifted-off.

In order to ensure the above-mentioned cleaning function, it is of crucial importance that the cleaning device and thus also the cleaning roll is stationed in a defined cleaning position. In particular, the cleaning position must be arranged in an area, in which also the frost line of the film material is located. A frost line in terms of the invention is understood to be, in particular, the point or the line, in particular the area along the circumferential direction of the casting roll, in which the transition takes place from the free-flowing material to the solid film material. Since a film-making machine normally performs a continuously carried-out production process, a quasi-stationary state will be experienced, which leads to a defined point or a defined circumference line of the casting roll, on which the frost line is arranged.

Now, in the area of the frost line, the film material on the one hand, is already hard enough to allow a corresponding force absorption to take place through making contact with the cleaning roll. At the same time, however, the free-flowing film material in the area of the frost line is still soft enough to allow the corresponding impurities to be pressed in and carried along on the inside towards the surface of the casting roll.

The adjusting mechanism provided by the invention now provides for distinctly higher flexibility of the cleaning device. As such the cleaning roll may perform an adjustment, in particular within defined limits/between defined end stops. This adjustment takes place in circumferential direction of the casting roll, i.e. in direction of rotation or contrary to the direction of rotation of the casting roll. Due to the fact that normally the configuration of the outlet gap and the lift-off position are defined, for example by means of a tear-off roll, it is possible, by adjusting the cleaning roll, to follow a variation in the frost line. For example, if a change of material is effected in the film-making machine, a change in melting temperature is frequently also present. This in turn leads to a change in the frost line as regards positioning, provided the line speed remains the same. Whilst with previously known film-making machines the line speed had to be throttled at high melting temperatures, in order to adapt the fixed contact length by reducing speed in such a way that the frost line matches the fixed position of the cleaning roll, it is now possible according to the invention to adapt the cleaning position in a flexible manner. In particular this allows maximum exploitation of the available contact surface on the casting roll. Thus even at high melting temperatures, due to maximum movement of the cleaning roll towards the rear, a slow cooling rate can be made available with a correspondingly slow cooling functionality of the casting roll.

With a cleaning roll according to the invention, this can of course be adapted to suit the cleaning function. For example, rubberised surfaces are feasible in order to achieve an improved cleaning function. Spirally-shaped grooves are also possible in order to improve the removal of air bubbles from the film web or from the cleaning roll.

Apart from the high stretchability achievable in this way, a distinct increase in line speed can be simultaneously achieved as can an increase in time-related production capacity of such a film-making machine.

It may be of advantage, if with a film-making machine according to the invention the adjusting mechanism comprises a radial adjustment of the radial position of the cleaning roll for changing the distance and/or the press-on force of the cleaning roll against the surface of the casting roll. Radial adjustment is therefore an additional adjustment option to circumferential adjustment, in particular circumferential adjustment and radial adjustment are configured separately and in particular independently from each other. This means that both adjustment directions i.e. adjustments in circumferential as well as in radial direction, can be carried out independently of each other. This allows different regulating scenarios to be made available. For example, while searching for the cleaning position or at the start of cleaning, the cleaning roll may be lifted off in order to avoid possible damage to the film web and/or the cleaning roll. Furthermore it is possible that, not until the cleaning position has been reached, is the cleaning roll moved into the contact position via a radial adjustment. Thus the distance reduces between the surface of the cleaning roll and the surface of the casting roll, which could also be called the cleaning gap. Apart from a relatively large adjustment between a large cleaning gap, for example for threading the film web, and a small cleaning gap a small adaptation—small in quantitative terms—is also feasible. As such radial adaptations, for example, in the range of a few micrometres, in particular in the range between 10 μm and 100 μm, can lead to an adaptation (to be described at a later point) with regard to a load situation. It is also possible to provide a drive for this radial adjustment, for example in a hydraulic, pneumatic and/or or motorised manner.

It is also advantageous to provide a tear-off roll on a film-making machine according to the invention, around which the film material, which has solidified to form a film web, runs when it lifts off the surface of the casting roll. The lift-off location defined by the position of the tear-off roll and the receiving location defined by the position of the outlet gap form a wrap angle of the casting roll, which lies in the range between approx. 260° and approx. 330°. These are, of course angular degrees. A preferred range is between approx. 270° and approx. 320°. An especially preferred range is between approx. 290° and approx. 305°. The larger this wrap angle, the larger is also the contact length. This allows correspondingly slower cooling rates, higher cooling outputs and/or higher line speeds to be achieved. A point to bear in mind is that always one parameter has to be optimised. For example, a larger contact length can be used to achieve a higher cooling output. In addition the large contact length can be utilised to run the plant at a higher line speed despite slower cooling rates due to this large contact length. The wrap angles described are used in particular for casting rolls with diameters in the range between approx. 1000 mm and 1500 mm. Casting rolls with a diameter between approx. 1200 mm and approx. 1400 mm are preferred.

A further advantage consists in that for a film-making machine according to the invention the circumferential adjustment of the adjusting mechanism is configured for a stepless adjustment, at least in sections, of the cleaning position of the cleaning roll in circumferential direction of the casting roll. A completely stepless adjustment of the cleaning position is particularly advantageous. For example, guiding gears, guiding rails or guiding means may be provided, which can be steplessly fastened, fixed or clamped in any circumferential position by means of clamping devices or other fixing means, for example. It is preferred, if this stepless adjustment of the cleaning roll is possible in particular in the absolute angle range between 115° and approx. 285° of the casting roll. In particular in the rearward area of the casting roll, i.e. for high angular degree numbers, a particularly fine stepless adjustment may be preferred, in order to allow a particularly accurate adaptation to the exact position of the frost line of the film material precisely at this location. The adjustment in circumferential direction may for example be accomplished by a chain drive.

In addition it is advantageous, if on a film-making machine according to the invention the circumferential adjustment of the adjusting mechanism is configured for a movement of the cleaning roll in circumferential direction of the casting roll into a maintenance position, in particular outside the frame of the film-making machine. In addition to the primary function according to the present invention of permitting an adaptation of the cleaning position to the frost line in a flexible manner, maintenance work which is necessary in addition to the operation of the plant, may be simplified in a manner according to the invention. In particular the available space to move with regard to at least one additional end position of the cleaning roll/the cleaning device and the adjusting mechanism may be widened. As such it is now possible according to this embodiment, to move the cleaning roll into a maintenance position, in which access to individual components or to the entire cleaning roll is made particularly easy. On the one hand this may lead to the cleaning roll now being moved out of the way in order to get access to other components of the film-making machine, in particular however, the cleaning roll itself may now be moved into a more accessible position in this manner. This is particularly advantageous for maintenance work or cleaning work after, for example, a tear-off of the film in the film-making machine has occurred. The frame in this case in particular serves to absorb the bearing loads arising. In particular such a frame may be configured as a housing.

A further advantage may be for the adjusting mechanism of a film-making machine according to the invention, in particular a radial adjustment of the adjusting mechanism, to comprise a sensor device for detecting at least one of the following load parameters of the cleaning roll with a view to load compensation. The sensor device is then adapted to suit the respective kind of load parameter.

Dead weight

Angle between dead weight vector of the cleaning roll and the casting roll

Circumferential position of the cleaning roll relative to the casting roll

Axial deflection of the cleaning roll

Axial contact progression and/or press-on force of the cleaning roll on the casting roll The above-mentioned listing is not a finite list. This sensor device is intended in particular for providing dead weight compensation. To this end the film-making machine is preferably equipped with a control unit for receiving and further processing sensor signals of the sensor device. Dead weight is to be understood here in the context of the different effects it has on the contact situation. For a positioning above the point of gravity and thus for a force vector, which is directed at the surface of the casting roll, at least at an acute angle, this should be based on the support given by the dead weight. In other words, the contact force, which develops between casting roll and film material is supported by the dead weight. If the cleaning roll is positioned below the point of gravity of the casting roll, the force vector would point away from the surface of the casting roll, so that the dead weight of the cleaning roll counteracts the contact force. According to the invention dead weight compensation is then possible due to the detection of the dead weight, the dead weight vector or indirectly due to the determination of the circumferential position of the cleaning roll. Similar compensation can be achieved also as regards the axial deflection of the cleaning roll, for example by means of sensor devices in the form of strain gauges. A correspondingly developing axial contact progression and/or progression of the press-on force can also be compensated for.

Furthermore it is advantageous if with a film-making machine according to the invention the cleaning device has at least one separate drive on each side of the cleaning roll for rotationally driving the cleaning roll. In particular, these drives are drive motors. The drives are synchronised with each other, in particular via a control unit, so that the casting roll and cleaning roll can be driven at the same rotational speed. Also the parallelism of the described cleaning roll and the casting roll are distinctly improved in this way. Undesirable torsion situations due to respective abutment forces or asynchronous drive situations for the cleaning roll are thereby effectively prevented. Alternatively a passive drive may be provided for the cleaning roll via friction with the casting roll and/or the film material. Mechanical synchronisation in terms of the present invention is also feasible.

Furthermore, it is advantageous if with a film-making machine according to the invention due the circumferential adjustment, the cleaning roll is swivelled about an adjustment axis, which in aligned in parallel, in particular coaxially, to the rotation axis of the casting roll. The adjustment axis therefore is the swivelling axis, about which the swivelling movement of the cleaning roll is performed. Now, if the cleaning roll is aligned, in particular coaxially, with the rotation axis of the casting roll, the cleaning roll in consequence also swivels about the rotation axis of the casting roll. The distance between cleaning roll and casting roll therefore remains the same, which means that the cleaning gap defined in this way also remains the same during the swivelling movement of the cleaning roll. This has big advantages, in particular if the embodiment of the adjusting mechanism is a simple one without a radial adjustment. For a combination between circumferential adjustment and radial adjustment this leads to an unequivocal separation of the two adjustment directions and thus to easier control/easier regulation.

A further advantage is achievable if with a film-making machine according to the invention a detection device is provided for detecting a frost line of the solidifying film material. The adjusting mechanism in particular comprises this detection device. In this way it is possible for example, to perform an automatic or a supporting manual detection of the frost line. A temperature sensor or an infrared sensor would, if automated, be in a position to accurately determine the frost line in correlation with stored temperature conditions of the film material. Using a camera the operating personnel can perform an optical control, again allowing the frost line to be detected in a supporting manner. This makes it possible to perform the method described at a later point in an automated manner in particular, in order to provide adaptation of the correct position with the desired reference to the frost line.

The subject manner of the present invention also comprises a method for adapting a cleaning position of a cleaning roll of a film-making machine, in particular in accordance with the present invention, comprising the following steps:

Detecting a frost line in the solidifying film material on the surface of a casting roll of the film-making machine, Moving the cleaning roll by means of a circumferential adjustment of an adjusting mechanism of a cleaning device in circumferential direction of the casting roll to the cleaning position at the frost line.

Due to using a film-making machine according to the invention a method according to the invention is accompanied by the same advantages as explained in detail with reference to a film-making machine according to the invention. Detection of the frost line and the corresponding movement may be performed in an automated manner, for example both with the aid of detection by sensor and manually by means of a visual check or by camera surveillance.

A method according to the invention can be further developed in such a way that the frost line is detected by means of a detection device, in particular in a continuous manner, in order to perform the movement of the cleaning roll into the cleaning position at the frost line in a controlled or regulated manner. The control device can thus be provided with respective sensor signals of the detection device, in order to subsequently perform movement of the cleaning roll in a controlling and/or regulating manner. As such automatic adaptation is for example feasible at the start of a production cycle. In addition, due to continuous detection, post-regulation can be provided, so that even if fluctuations in production quality are experienced and thus a variation in the location of the frost line, the cleaning functionality is provided in an inventive manner with high cleaning quality.

It is also advantageous if with a method according to the invention, the cleaning position occupied by the cleaning roll lies in an range of ±5°, in particular 0° to 5°, about the detected frost line, in particular in the range of ±2°, preferably between 0° and 2°, about the detected frost line. These degree values are angular degrees about the frost line. The more accurate the cleaning position taken is, the more accurate and thus the higher is the cleaning function/the cleaning quality available. However, by pre-setting an appropriate tolerance range, it is possible to achieve both the respectively necessary detection device and the accuracy of the possible movement of the adjusting mechanism with simpler regulation and a simpler mechanism.

Another advantage consists in that with a method according to the invention at least one load parameter of the cleaning roll is detected, wherein load compensation for the cleaning roll is performed on the basis of the detected load parameter. This is understood to mean, in particular, compensation of the dead weight, compensation of the deflection and/or compensation of the contact force, as has already been repeatedly explained.

Further features and details of the invention are revealed in the description below, in which exemplary embodiments of the invention are described in detail with reference to the drawings. The features mentioned in the claims and in the description may be essential to the invention individually on their own, or in any random combination.

FIGS. 1 to 5 show an embodiment of a film-making machine 10 according to the invention. The main components of the film-making machine 10 are arranged within a frame 12, which here may be configured as a housing, wherein components are, in particular, mounted in a fixed or movable manner. Free-flowing film material 100 is supplied from an outlet device 20 via an outlet gap 22. This is effected for example by upstream extruder devices, which melt respective plastic material and apply it to the surface 32 of the casting roll 30 through the outlet gap 22.

The casting roll 30 rotates anti-clockwise and comprises a cooled surface 32. As a result the film material 100 is solidified during rotation, until at a certain point in time the free-flowing film material 100 has solidified forming a film web 110. The location of this solidification is depicted as a frost line FL in FIG. 1.

Figure 1:
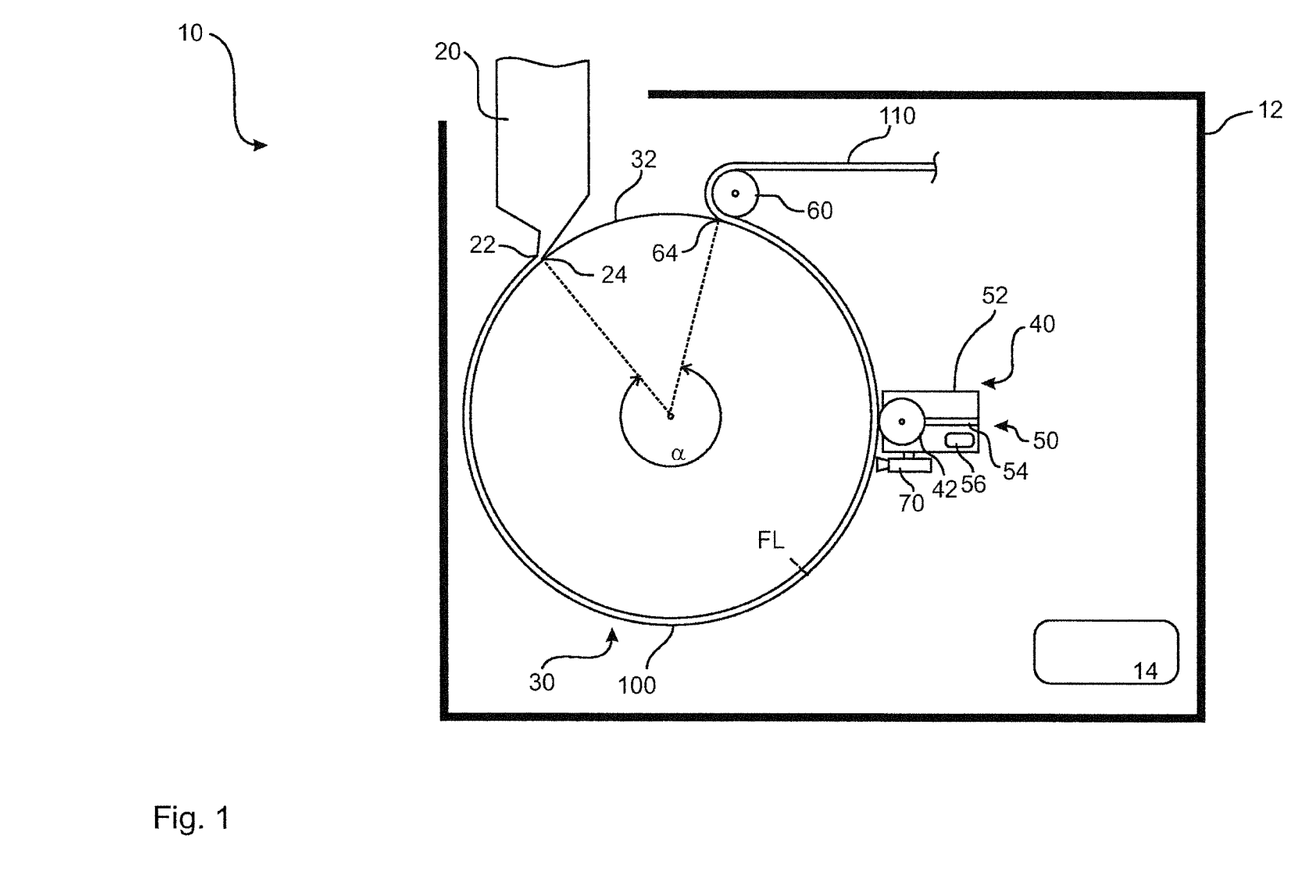
FIG. 1 schematically shows a first embodiment of a film-making machine according to the invention, FIG. 2 schematically shows the embodiment of FIG. 1 while searching for the frost line, FIG. 3 schematically shows the embodiment of FIGS. 1 and 2 with the cleaning device in a cleaning position, FIG. 4 schematically shows the embodiment of FIGS. 1 to 3 with the cleaning device in a parking position, FIG. 5 schematically shows the embodiment of FIGS. 1 to 4 with the cleaning device in a maintenance position, FIG. 6 schematically shows a top view of a film-making machine with the cleaning roll in a first position, and FIG. 7 schematically shows the view of FIG. 6 with a cleaning roll in the second position.
Figure 2:
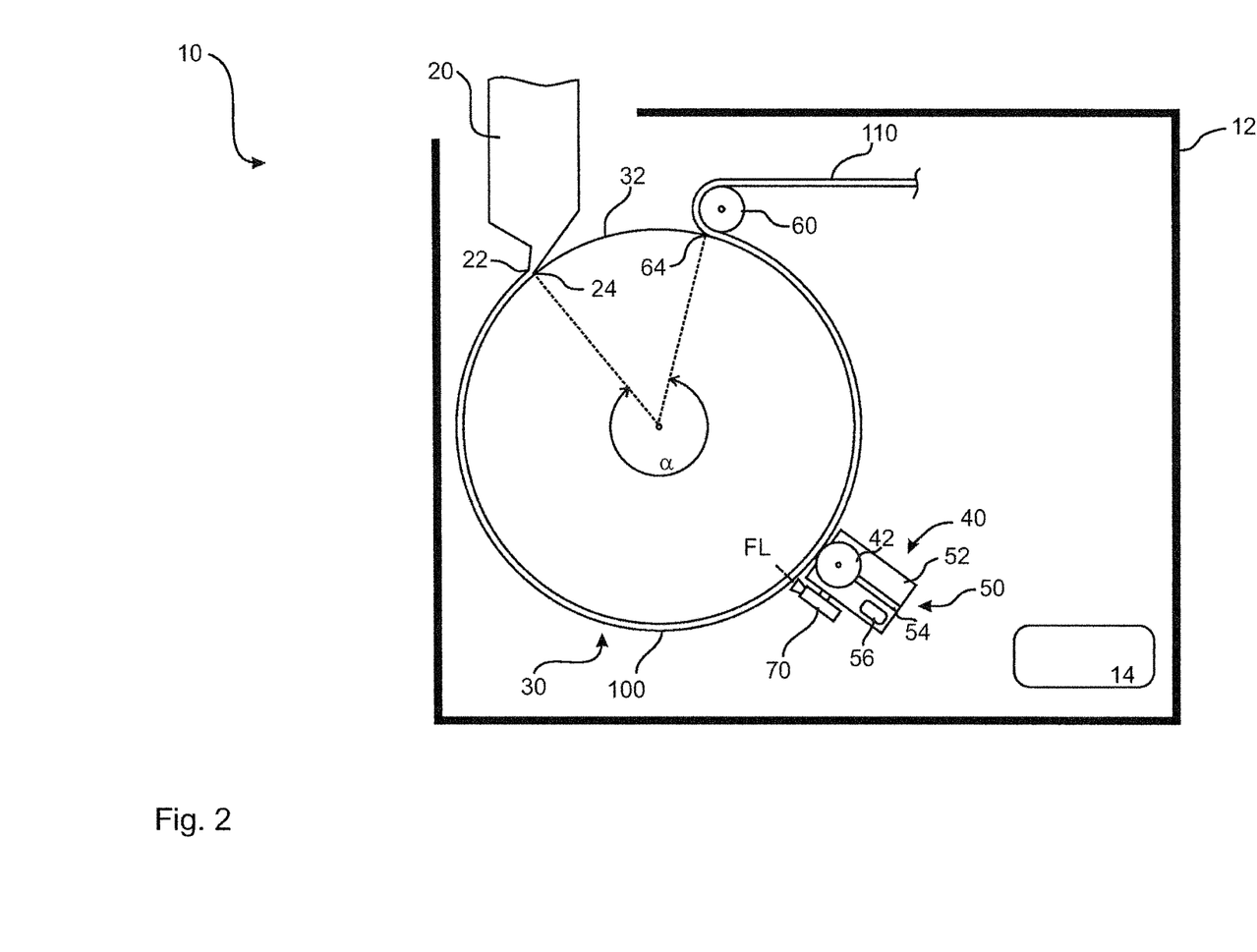

As is also revealed in FIG. 1, a respective tear-off roll 60 is arranged defining a lift-off location 64 for the film web 110. A wrap angle α is thus formed in conjunction with the receiving location 24, the angle of the casting roll 30 here being approx. 300°. A correspondingly high contact length is thereby formed so that according to FIG. 1 a reduction in the cooling rate would be possible, as a result of which slower cooling would lead to a frost line FL shifted further back anti-clockwise in circumferential direction. If the rotational speed and thus the line speed were to remain unchanged, a stretch film with increased stretchability could be provided in this way.

Figure 3:
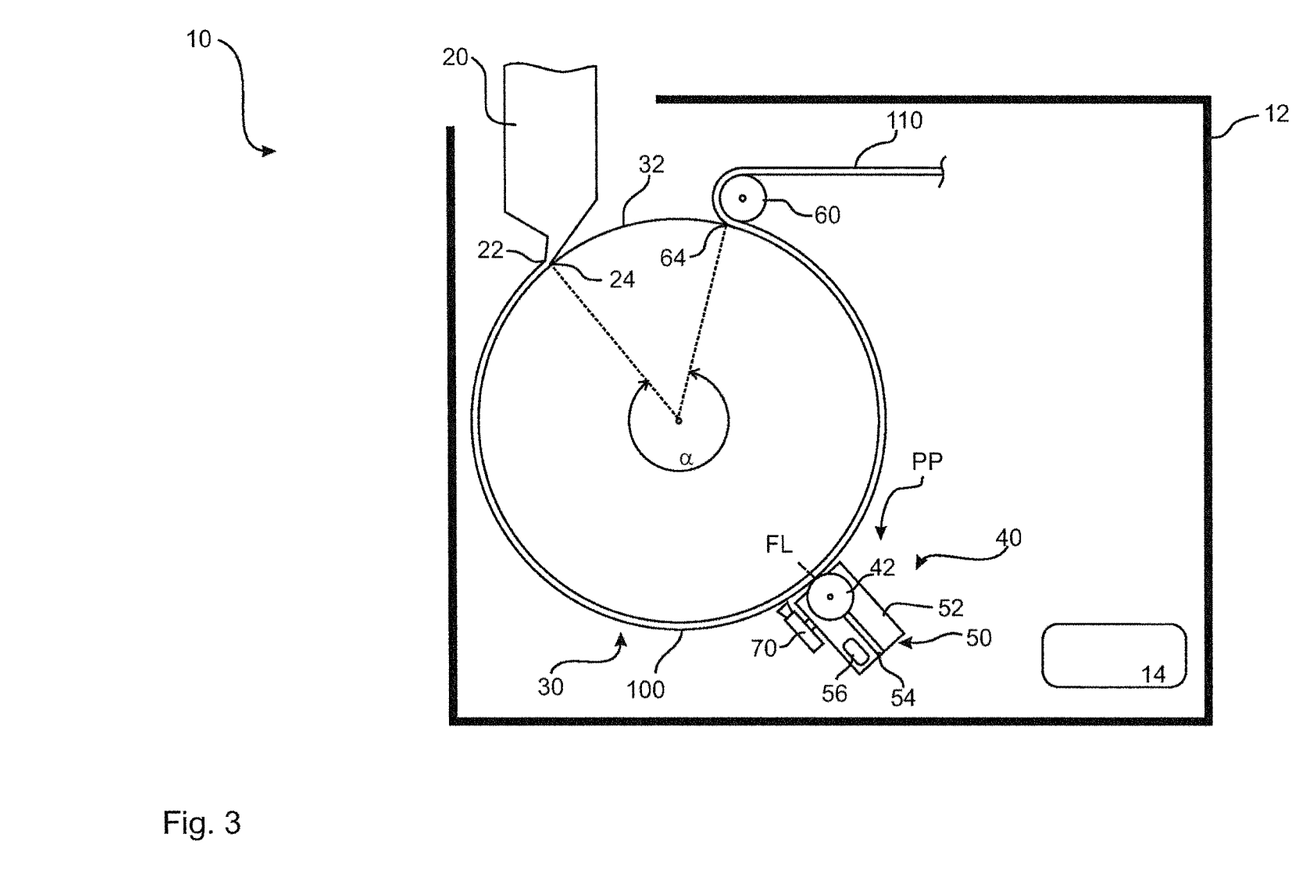

If the production process is then carried out/continued, an adaptation of the cleaning position PP of a cleaning device 40 can be carried out once or continuously, as will now be described. As shown in FIG. 1 a detection device 70 is used to detect the frost line FL. This may for example be a camera, an infrared sensor and/or a temperature sensor. An adjusting mechanism 50 here is equipped with a circumferential adjustment 52, which is part of the detection device 70. A circumferential adjustment is then carried out up to a location shown in FIG. 2. Here the detection device 70 detects the frost line FL. By moving back clockwise along the circumferential direction of the casting roll 30, the cleaning roll 42 takes up the cleaning position PP as shown in FIG. 3. In this position radial adjustment 54 is still insignificant. The preceding steps, detection of the sensor data as well as the respective control/regulation of the adjusting mechanism 50 is carried out by the control unit 14 shown, which is connected in signal communication with the corresponding components. In addition a sensor device 56 can provide the sensor system explained below for a necessary or desired compensation of the dead weight, contact pressure or similar load parameters.

Figure 4:
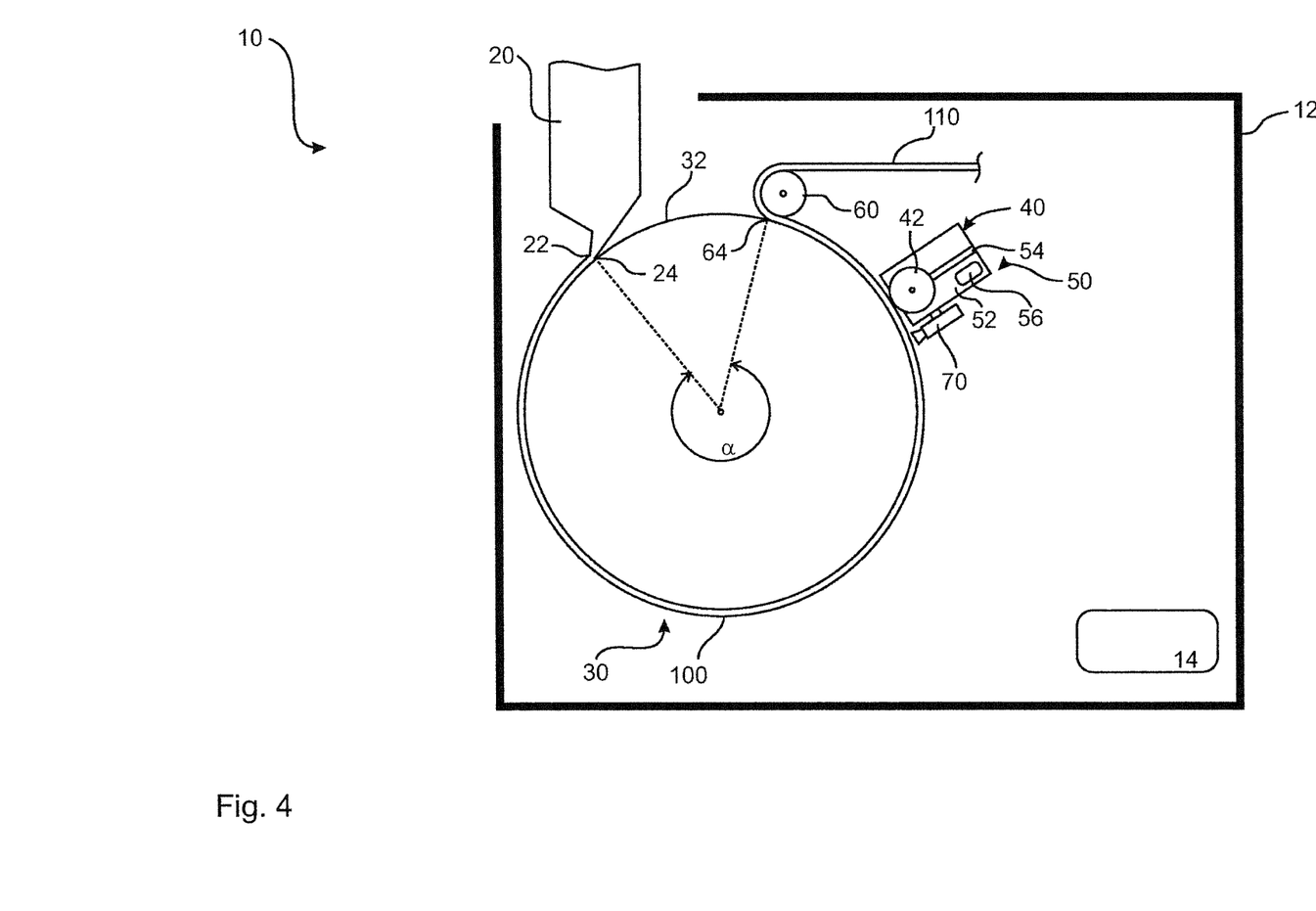

When production comes to an end or when the film web 110 has to be threaded at the start of production, the cleaning device 40 can assume a parking position as per FIG. 4. Apart from adjustment with the aid of the circumferential adjustment 52, the cleaning roll 42 here is radially offset in direction of the outside with the aid of the radial adjustment 54, so that the cleaning gap developing would be distinctly enlarged. Threading is thereby made easier.

Figure 5:
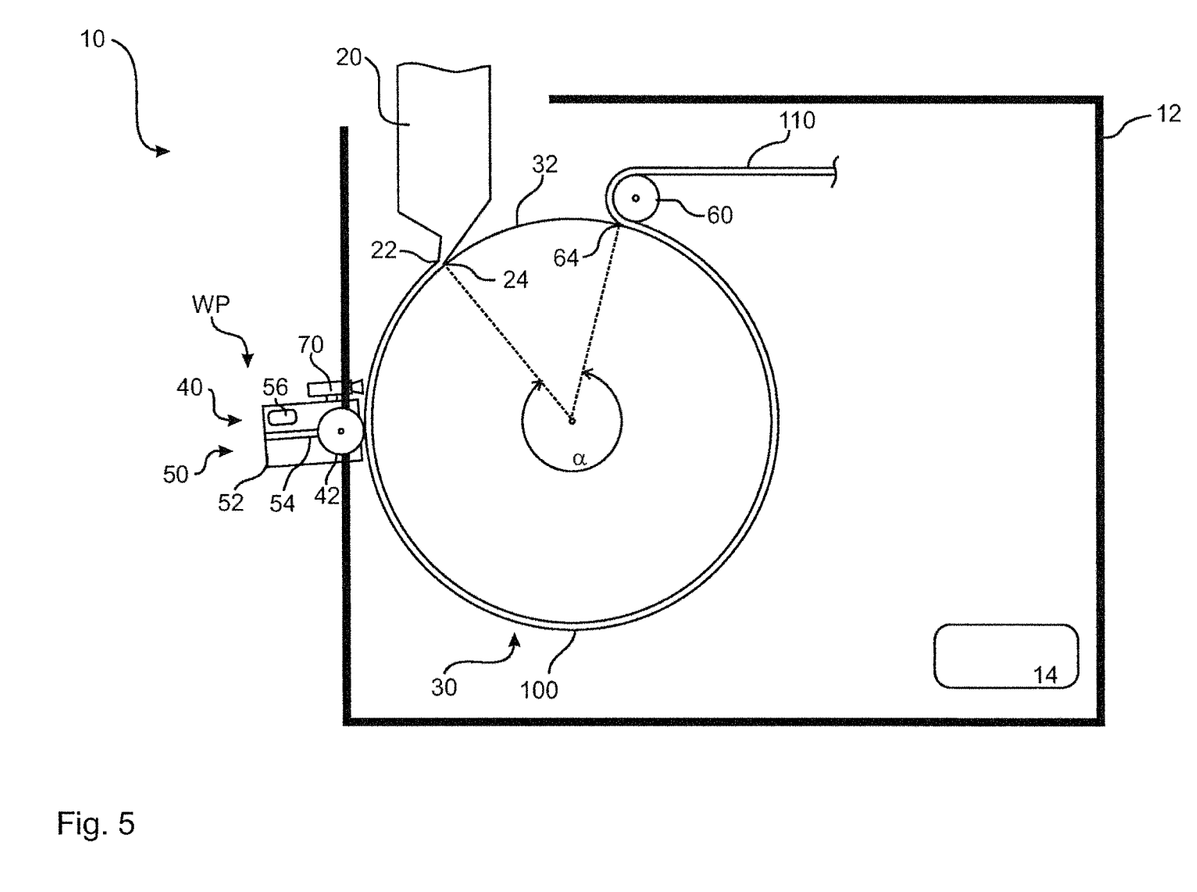

If the film web 100 inside the film-making machine breaks or if maintenance work has to be carried out on the film-making machine 10 within the frame 12 or on the cleaning device 40, the entire adjusting mechanism 50 can move the cleaning device 40 into a maintenance position WP, as shown in FIG. 5. Here the cleaning roll 42 and in particular the entire adjusting mechanism 50 as well as a large part of the cleaning device 40 are outside the frame 12.

Figure 6:
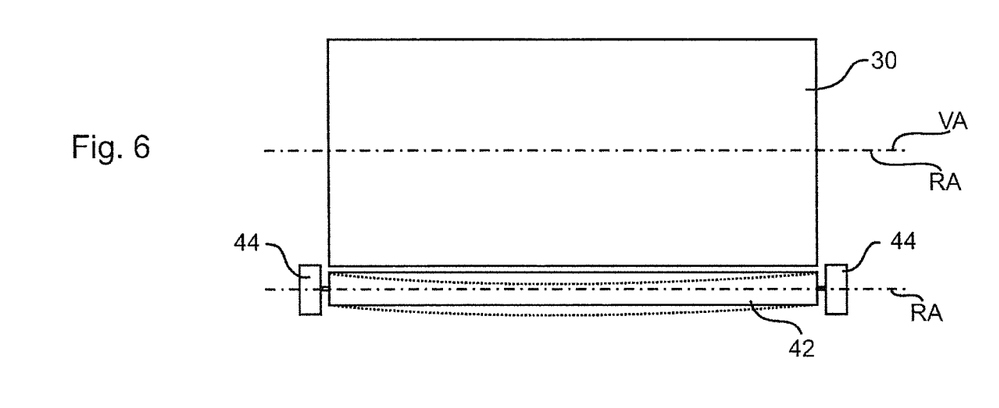
Figure 7:
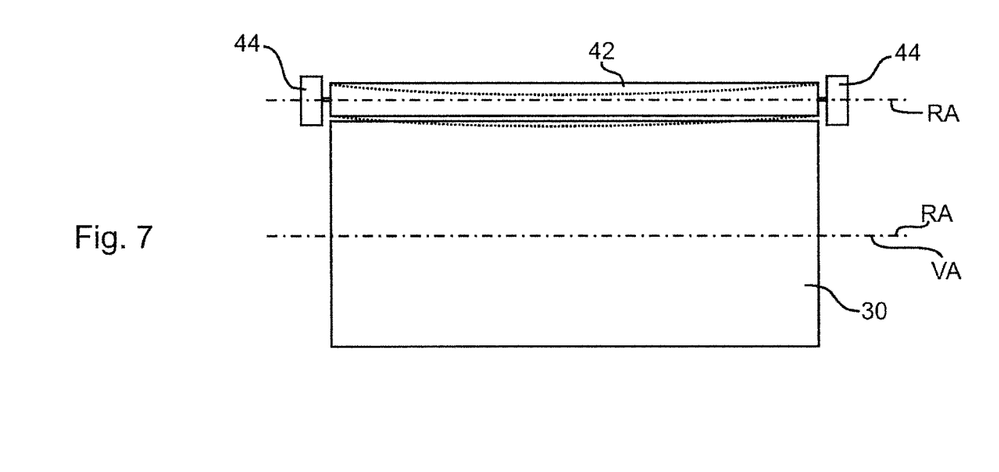

FIGS. 6 and 7 shown an option for compensation of different load parameters of the cleaning roll 42. It can be recognised that for a situation, where the cleaning roll 42 is arranged below the casting roll 30, both the corresponding deflection (see dotted lines) and the corresponding force vector aligned in a downward direction reduce the contact force between cleaning roll 42 and casting roll 30. A corresponding re-adjustment in upward direction for a reduction in the cleaning gap may lead to compensation of the effect. Conversely, the situation as per FIG. 7 is formed in that the described deflection of the cleaning roll 42 and its dead weight supports the contact effect and thus the press-on force to the casting roll 30. For a corresponding compensation of this situation a radial adjustment 54 would again enlarge this cleaning gap and/or the press-on force and thus produce the compensation effect. As also revealed in FIGS. 6 and 7, the corresponding axes, i.e. the adjustment axis VA of the adjusting mechanism 50 and the rotation axis RA of the casting roll 30 are aligned in parallel and coaxial to each other. The rotation axis RA of the cleaning roll 42 is aligned in parallel to the rotation axis RA of the casting roll 30. Finally there are two separate drives 44 in the form of electric motors arranged on both sides of the cleaning roll 42, wherein these drives 44 are synchronised with each other. Synchronisation can for example be ensured via the control unit 14 as already explained.

The above explanation of the embodiments describes the present invention exclusively in terms of examples. It is of course possible to freely combine individual features of the embodiments insofar as technically meaningful without leaving the scope of the present invention.

The invention claimed is:

1. A film-making machine that produces stretch film comprising:
    an outlet device with an outlet gap for outlet of free-flowing film material and a rotatably mounted casting roll that receives the released free-flowing film material on a surface of the casting roll; and
    a cleaning device with a rotatably mounted cleaning roll that contacts the film material lying on the surface of the casting roll,
    wherein
    the cleaning device has an adjuster with a circumferential adjustment that adjusts a cleaning position of the cleaning roll along a circumferential direction of the casting roll and the circumferential adjustment of the adjuster is configured for a movement of the cleaning roll in the circumferential direction of the casting roll into a maintenance position outside a frame of the film-making machine.

2. The film-making machine according to claim 1, wherein the adjuster comprises a radial adjustment that adjusts a radial position of the cleaning roll to adjust a distance and/or press-on force of the cleaning roll against the surface of the casting roll.

3. The film-making machine according to claim 1, further comprising a tear-off roll around which a film material that has solidified to form a film web runs as it lifts off the surface of the casting roll, wherein a lift-off location defined by the position of the tear-off roll and a receiving location defined by the position of the outlet gap form a wrap angle (α) of the casting roll of approximately 260° to approximately 330°.

4. The film-making machine according to claim 1, wherein the circumferential adjustment of the adjuster is configured for a stepless adjustment of the cleaning position of the cleaning roll in the circumferential direction of the casting roll.

5. The film-making machine according to claim 1, wherein a radial adjustment of the adjuster comprises a sensor that detects at least one load parameter of the cleaning roll for a load compensation selected from the group consisting of:
    dead weight,
    angle between dead weight vector of the cleaning roll and the casting roll,
    circumferential position of the cleaning roll relative to the casting roll,
    axial deflection of the cleaning roll, and
    axial contact progression and/or press-on force of the cleaning roll on the casting roll.

6. The film-making machine according to claim 1, wherein the cleaning device on each side of the cleaning roll comprises at least one separate drive for a rotational drive of the cleaning roll.

7. The film-making machine according to claim 1, wherein the cleaning roll due to the circumferential adjustment is swivelled about an adjustment axis aligned coaxially to a rotation axis of the casting roll.

8. The film-making machine according to claim 1, further comprising a detector that detects a frost line of a solidifying film material, wherein the adjuster comprises the detector.

* * * * *